United States Patent [19]

Granberg et al.

[11] 4,386,349

[45] May 31, 1983

[54] HIGH RESOLUTION GRAPHICS SMOOTHING

[75] Inventors: Mauritz L. Granberg, Minneapolis; David G. Hanson, Spring Lake Park; Robert L. Rajala, Minneapolis; William G. Whipple, Eagan, all of Minn.

[73] Assignee: Sperry Corporation, New York, N.Y.

[21] Appl. No.: 258,252

[22] Filed: Apr. 28, 1981

[51] Int. Cl.[3] .................................................. G06F 3/14

[52] U.S. Cl. .................................... 340/723; 340/728; 340/724; 340/736

[58] Field of Search ............... 340/723, 724, 728, 730, 340/736, 750

[56] References Cited

U.S. PATENT DOCUMENTS

| | | | |
|---|---|---|---|
| 3,337,860 | 8/1967 | O'Hara | 340/736 |
| 3,418,518 | 12/1968 | Reese | 340/724 |
| 3,440,480 | 4/1969 | Henderson | 340/736 |
| 3,573,789 | 4/1971 | Sharp | 340/728 |
| 4,237,457 | 12/1980 | Houldsworth | 340/728 |

*Primary Examiner*—Michael A. Masinick

*Attorney, Agent, or Firm*—William C. Fuess; Kenneth T. Grace; Marshall M. Truex

[57] ABSTRACT

A method and apparatus whereby an auxiliary yoke is used in conjunction with a CRT display to correctively deflect the electron beam to a true position within each pixel of a graphics figure, as the graphics figure is displayed on the CRT's screen. The apparatus thus increasing the display's resolution within each pixel so as to permit the smoothing of the displayed graphics figures.

The improved resolution being achieved via a four bit binary position correction code, three bits of which are stored in the image memory at those memory addresses corresponding to the coordinates of the pixels that comprise the graphics figure, and one bit of which position correction code is stored at the immediately preceeding memory addresses. The entire position correction code in turn being decoded as the image memory is read and used to drive one or the other of the x and y coil pairs of the x-y auxiliary yoke.

8 Claims, 9 Drawing Figures

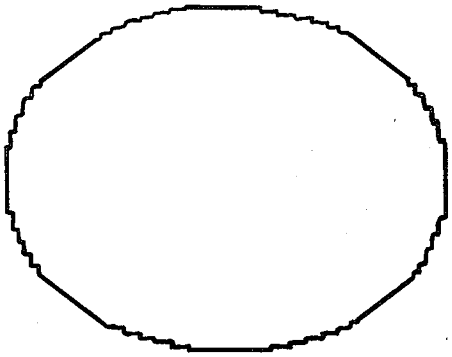
Fig. 2a
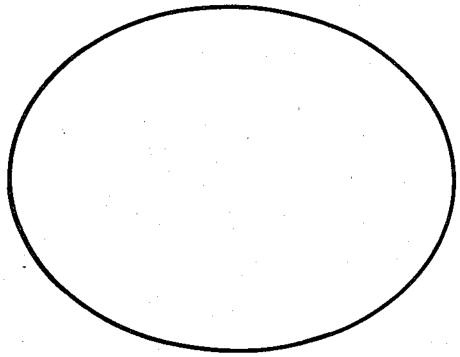
Fig. 2b
| PREAMBLE CODE FORMAT | | | | |
|---|---|---|---|---|
| CODE | | | | EXPLANATION |
| 0 | 0 | 0 | 0 | NO CORRECTION |
| 0 | 0 | 0 | 1 | X CORRECTION |
| 0 | 0 | 1 | 0 | Y CORRECTION |
Fig. 3a
| POSITION CORRECTION CODE FORMAT | | | | |
|---|---|---|---|---|
| FIGURE PIXEL | SIGN | MAGNITUDE $M_1$ | $M_2$ | EXPLANATION |
| 1 | 0 | 1 | 1 | +3/8 |
| 1 | 0 | 1 | 0 | +1/4 |
| 1 | 0 | 0 | 1 | +1/8 |
| 1 | 0 | 0 | 0 | 0 |
| 1 | 1 | 1 | 1 | −1/8 |
| 1 | 1 | 1 | 0 | −1/4 |
| 1 | 1 | 0 | 1 | −3/8 |
| 1 | 1 | 0 | 0 | −1/2 |
Fig. 3b

HIGH RESOLUTION GRAPHICS SMOOTHING

BACKGROUND OF THE INVENTION

The present invention relates to graphics displays and in particular to raster scan type displays that use a cathode ray tube (CRT). Specifically the present invention relates to a technique and apparatus for increasing the resolution of such graphics displays, thereby enabling the smoothing of the appearance of the figures that are generated. The improvement essentially comprising the addition of three planes to an image memory and the addition of an x-y decoder, driver and x-y auxiliary yoke to the CRT for positionally correcting the electron beam of the CRT within each pixel of any figure depending upon a peculiar position correction code that is generated for these pixels by the graphics generator of the display.

Previously when displaying graphics figures, upon close inspection of a display's screen, it would be apparent to an observer that the graphics figures were not produced with a smooth definition between the successive pixels that comprised each graphics figure. While the relative smoothness of each graphics figure was less noticeable to an observer as he positioned himself at greater distances from the display's screen, in many applications, it was necessary to remain close to the screen. Therefore it is desirable to generate smoother appearing graphics figures and thereby alleviate eyestrain and produce a more exact representation of each graphics figure.

While numerous algorithms and techniques are known in the art for determining the individual points that comprise any given graphics figure, each algorithm or technique generally suffers from some error that accumulates as a graphics figure is generated. The primary component of the error, however, generally results from the limited resolution of most commercially available CRT's, and which CRT's typically provide for a resolution of 512 by 512 pixels or a corresponding binary x, y resolution of nine bits by nine bits.

It is therefore a primary object of the present invention to provide a graphics display having an increased resolution.

It is another object of the present invention to increase a CRT's resolution via the generation of a position correction code for each pixel of a figure and the addition of an auxiliary yoke and associated decoder, drive circuitry to drive the auxiliary yoke's x and y coils in response thereto, and thereby correctively deflecting the electron beam, as necessary, for each pixel of a displayed figure.

These objects and others will become more apparent upon a reading of the hereinfater described method and apparatus.

SUMMARY OF THE INVENTION

Apparatus for increasing the resolution of a graphics display, whereby the generated coordinates of each pixel of a graphics figure are assigned an associated four bit binary position correction code that is used to correctively deflect the electron beam to a true position within each pixel. The position correction codes are determined by a graphics generator as it calculates the x, y coordinates of the pixels that comprise each graphics figure. The graphics generator also determines a preamble code for the pixels preceding the pixels on each graphics figure and which code defines whether the position correction within a pixel will be in the x or y direction. The preamble and position correction codes being stored in an image memory at two addresses corresponding to the x-y coordinates of the pixels.

The image memory address control unit (IMAU) of the present apparatus also produces horizontal and vertical synchronization signals that are used to synchronize the drive to the CRT's primary x and y yokes and the drive to the x and y coils of the x-y auxiliary yoke so that the corrective deflection occurs in synchronization with the unblanking of the CRT's grid. The position correction code, however, being first decoded via push-pull type, x and y decoder, driver circuits associated with the respective x and y coil pins of the x-y auxiliary yoke. The IMAU further enabling the reading of the image memory during each refresh cycle, independent of the graphics generator.

An alternative position correction code scheme is also taught. The distinction between the schemes being that the reference point for each pixel is established at the center of each pixel for the preferred embodiment and at one corner thereof for the alternative embodiment.

BRIEF DESCRIPTION OF THE DRAWINGS

FIG. 2*a* is a representation of an ellipse as it would be displayed on a CRT that does not use the present invention.

FIG. 2*b* is a representation of the ellipse FIG. 2*a* as it would appear on a display that contains the present invention.

FIG. 3*a* shows the various preamble codes that are stored in the image memory at the pixel address preceding each pixel that is connected.

FIG. 3*b* shows the various position correction codes and the corresponding magnitude of correction.

DESCRIPTION OF THE PREFERRED EMBODIMENT

Figure 1A:
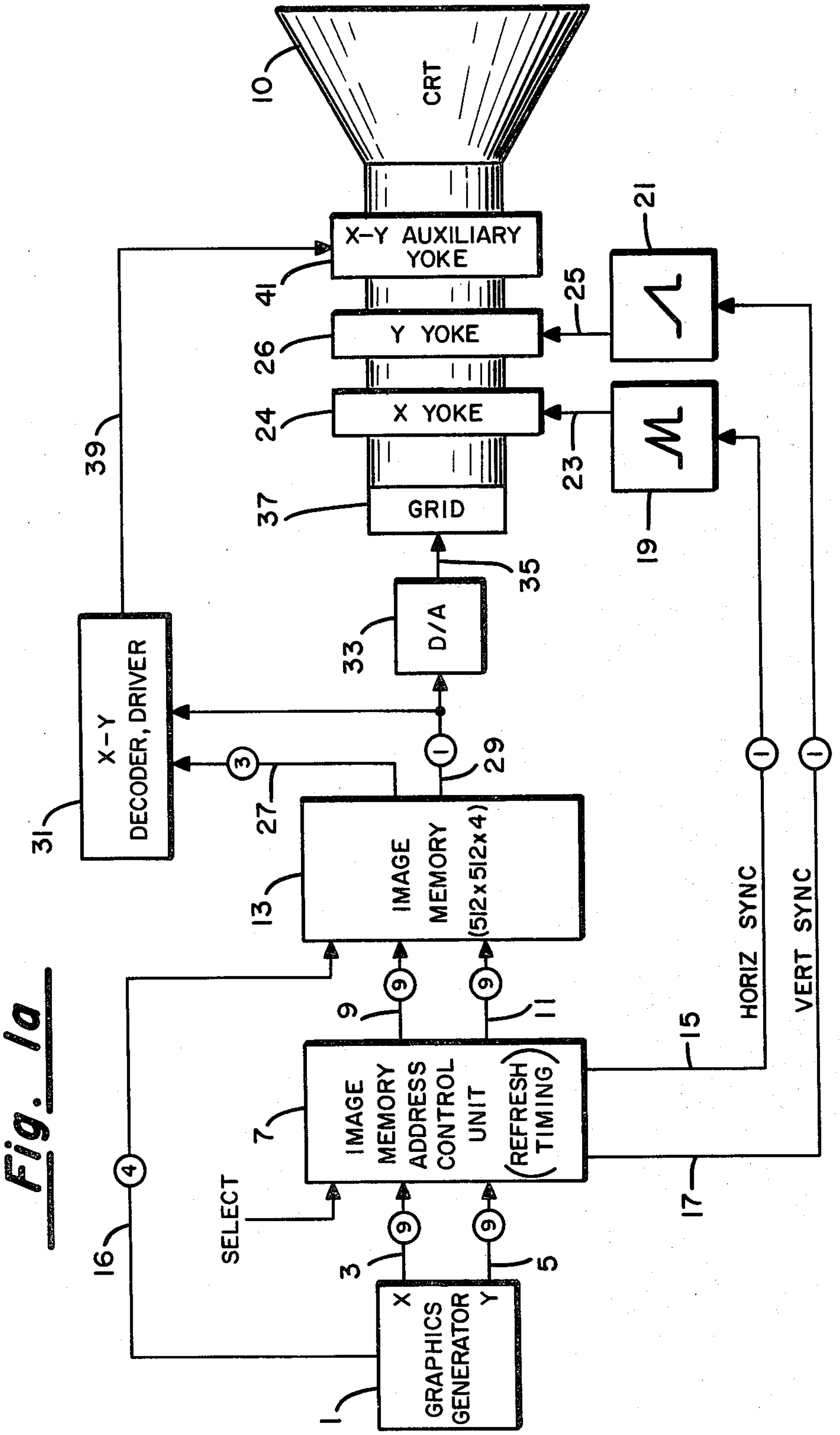
FIG. 1*a* is a functional block diagram of the improved CRT display.

Referring to FIG. 1, a generalized block diagram is shown of the primary elements of the present invention. These elements generally act to increase a display's resolution and thereby improve the appearance of the displayed graphics figures. In particular, the present invention acts in concert with the raster scan circuitry of CRT 10 and essentially functions in the following manner. Upon initiation of the display and after the desired graphics figure has been selected as well as after the location and size thereof on the display has been defined, the graphics generator 1 acts to determine the individual points that are to comprise the outline of the graphics figure. The resolution to which the graphics generator 1 responds, however, is limited by the resolution of the CRT 10 and which for the CRT of the preferred embodiment is limited to a matrix of 512 by 512 pixels. Thus the graphics generator 1, as it calculates the various points, produces the nine bit by nine bit address corresponding to the x and y coordinates for each of the calculated points of the graphics figures.

This basic address information is then transmitted via the nine bit buses 3 and 5 to the image memory address control unit (IMAU) 7. Assuming that the calculation mode has been selected for the IMAU, the address information is retransmitted via the nine bit buses 9 and 11 to the image memory 13. There the binary address information acts to address the corresponding memory locations within each of the planes of the image memory 13 and to cause the appropriate binary code to be written into the addressed locations on each of the memory planes.

At the same time that the address information is being transmitted to the image memory 13, the graphics generator 1 transmits a four bit binary position correction code via the four bit bus 16 to the image memory 13. This position correction code, which will be described in greater detail hereinafter, generally defines the amount of positional correction that is required per pixel and it is this code that is stored within the addressed locations of the image memory 13.

Figure 1B:
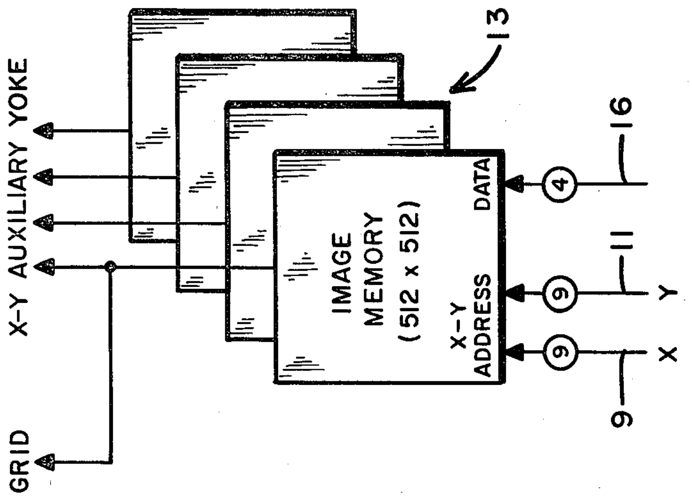
FIG. 1*b* is a representation of the various memory planes in the image memory necessary to accommodate the preamble and position correction codes.

In particular and upon reference to FIG. 1*b*, the image memory 13 in the preferred embodiment has been segmented into four memory planes. Each memory plane being identical to each other and each being segmented into a 512 by 512 bit matrix and each address location corresponding to a unique one of the pixels of the CRT 10. Thus, the graphics generator 1 acts to define each pixel of the CRT 10 that is to be displayed as well as the specific location within each pixel to which the electron beam is to be directed.

In the preferred embodiment the graphics generator 1 has been implemented in a software fashion according to Bresenham's algorithm and which algorithm is described in an article by M. L. V. Pitteway, entitled "Algorithm For Drawing Ellipses or Hyperbolae With A Digital Plotter", in the *Computer Journal*, Volume 10, No. 3, (November 1967), pp. 282–289. While a software graphics generator 1 has been used in the preferred embodiment, numerous other hardware and software techniques are known in the art for performing the same function. For instance a hardware example of a graphics generator that could perform the presently desired functions can be found in the U.S. patent application of W. Hartwig, entitled "DIGITAL GRAPHICS GENERATION SYSTEM", Ser. No. 40,610. The important point to be made, however, is that the graphics generator 1 must operate at a speed compatible with the application. Thus, if one is designing the display for a real time application, it is necessary that the graphics generator 1 be sufficiently fast to accept the data and calculate the requisite points and load the correct information into the image memory so that it can be used by the display system in a timely fashion. The refresh time, however, being less critical.

Once the appropriate binary information has been stored in the image memory 13, the display system is able to switch over to its refresh mode and during which the image memory 13 is read and the contents thereof used to deflect the electron beam of the CRT 10 so as to illuminate the various pixels that comprise the calculated graphics figure. During the refresh mode, the IMAU 7 is selectively switched so as to cause the sequential reading of each of the addresses of the image memory 13 in a raster scan fashion and that synchronization of this read operation with the raster scanning of the CRT 10. The synchronization of the CRT 10 and the readout of the image memory 13 being achieved via the single bit horizontal sync and vertical sync data on lines 15 and 17 and which sync data acts to clock the respective horizontal and vertical sawtooth generators 19 and 21. The horizontal and vertical sawtooth generators 19 and 21 in turn responding to their digital sync inputs to produce analog outputs on lines 23 and 25 which are used to drive the x and y yokes of the CRT 10 and cause the deflection of the electron beam in a raster scan fashion across the screen of the CRT 10.

At the same time, the IMAU 7 sequentially scans the various addresses of the image memory 13 in each of its four planes and reads out the binary position correction information stored at the various addresses. The coded binary information is then transmitted via the three bit bus 27 and the one bit bus 29 to the x-y decoder, drive circuitry 31 and the digital to analog converter 33.

While each of the four bits of coded binary data is impressed upon the x-y decoder, driver circuitry 31, only one of the coded bits is impressed upon the digital to analog converter 33. This single bit of data being obtained from the plane of the image memory that contains the reference points within each of the corresponding pixels of the CRT 10. In particular for the preferred embodiment, the reference point has been established at the center of each pixel. Thus upon reading this one bit of binary information from the image memory 13, an analog signal is produced via the digital to analog converter 33 and impressed via line 35 upon the grid 37 of the CRT 10. There the analog signal causes the CRT 10 to unblank the electron beam and thus permit the deflection of the electron beam to the center of the pixel corresponding to the address of the image memory 13 containing the coded binary data.

Recalling that the electron beam is directed to the center of the pixel, unless otherwise deflected, and realizing that the true point on the graphics figure may not be the same, it is desirable that the display system be able to incrementally deflect the electron beam within each pixel to the exact point calculated by the graphics generator 1 for each pixel of each graphics figure. This function is accomplished via the decoding of the four bits of binary information on lines 27 and 29 by the x-y decoder, driver circuitry 31 and the production of an analog signal on line 39 that is coupled to either the x or y coil pins of the x-y auxiliary yoke 41. Depending upon the magnitude of the analog signal and recognizing the additive effect of the auxiliary coil's magnetic perturbation, the electron beam will be directed to the true calculated point and not the reference point.

The graphics generator of FIG. 1*a*, thus permits a graphics display system to display graphics figures having a uniform outline. In this regard attention is directed to FIG. 2*a* wherein an example is shown of an ellipse which would have been displayed in a prior art graphics display system that utilized a single plane for the image memory 13. While the outline of FIG. 2*a* is somewhat exaggerated relative to the error which occurs during the displaying of the ellipse, it does demonstrate the error which occurs in the graphics figure due to the nominal resolution of a typical CRT and the requirement of having to display the reference point for each of the pixels on the graphics figure.

On the other hand, FIG. 2*b*, which represents an example of the ellipse of FIG. 2*a* as it would have been displayed by a display system containing the present invention, is a much more appealing graphics figure and which figure is not dependent upon an observer's distance from the screen of the CRT. Thus the present display system essentially improves the appearance of its graphics figures by increasing the resolution of the CRT. This is accomplished via the generation of an additional three bits of position correction data at the expense of 750 kilobits or three planes of image memory.

Prior to continuing with a detailed description of the IMAU 7, the position correction coding scheme and the x-y decoder, driver circuitry 31, though, one should note some of the design vagaries which are present in the present description. In particular one should note that for a CRT having a 10 inch square viewing screen and a 512 by 512 pixel matrix, each pixel corresponds to a square area of the electron beam approximately 0.020 square inches. Concurrently, the x and y coils of the x-y auxiliary yoke 41 have to be sized so as to enable the deflection of approximately 0.018 degrees, if the CRT has a deflection capability of 90 degrees. It should be further noted that while the present invention has been described with respect to three bits of increased resolution, more or less bits can be used depending upon the specific application. The choice however requiring a trade-off to be made between cost and desired resolution.

Figure 1C:
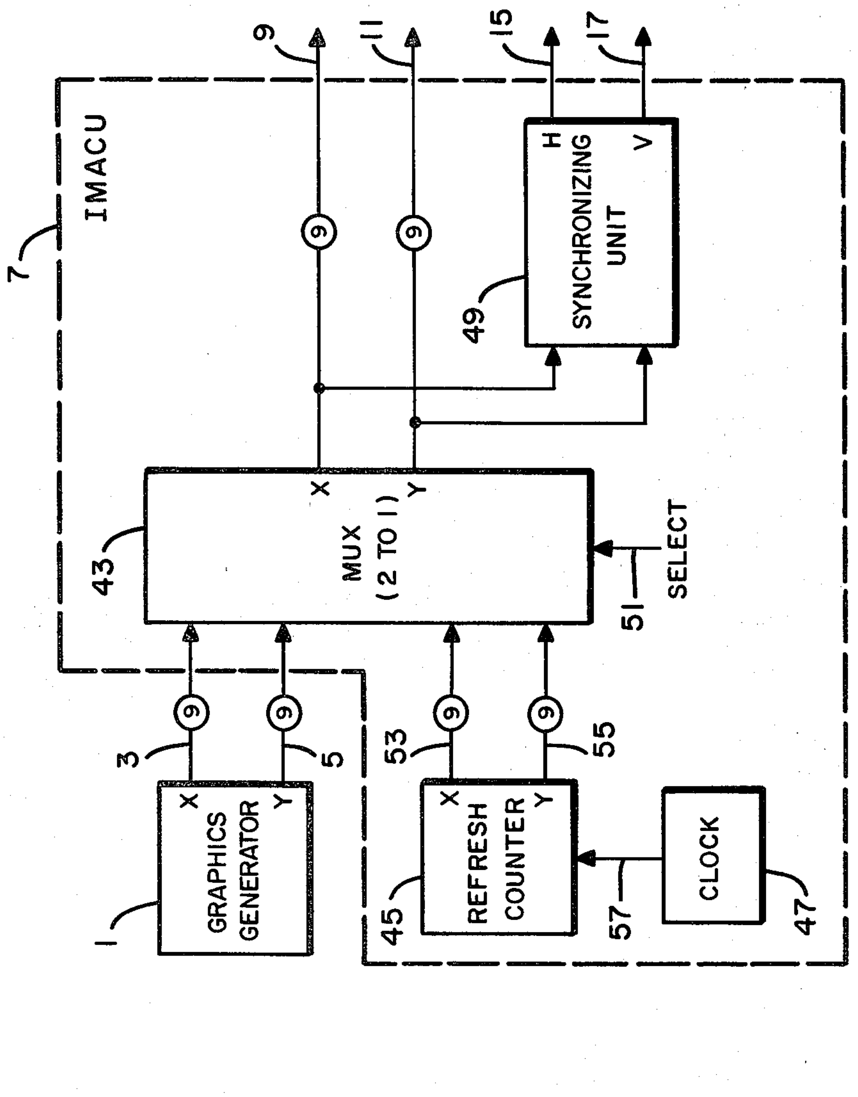
FIG. 1*c* is a more detailed block diagram of the image memory address control unit.

Returning now to the description of the display system of FIG. 1*c*, attention is directed to FIG. 1*b* wherein a more detailed block diagram is shown of the IMAU 7. In particular, one should note that the IMAU 7 is essentially comprised of a mux (i.e. two-to-one multiplexor) 43 having its inputs coupled to the graphics generator 1 and a refresh counter 45. The refresh counter 45 essentially comprising two, nine bit, UP counters, and to the refresh counter 45 in turn being coupled to a clock 47. The multiplexor 43 also being coupled on its output side to the synchronizing unit 49 and which unit is essentially comprised of the means necessary to produce the horizontal and vertical sync signals at a frequency compatible with the required row and column refresh times of the CRT 10. This function also being achieved via any number of readily known techniques, but which techniques enable the apparatus to extract a clock signal from the x axis address on the nine bit bus 9 for controlling the horizontal sync rate of the CRT 10 (i.e. the rate at which each pixel of each row of the CRT 10 is scanned). The columns of the CRT 10, in turn, being scanned at a delayed rate determined from the clock signal extracted from the y axis address information on the nine bit bus 11.

Thus, as previously mentioned, the graphics display system operates in either a calculation or a refresh mode. These modes being determined by a select signal on line 51 to the mux 43. While the calculation mode has been generally described, a brief description will now be made relative to the operation of the IMAU 7 in its refresh mode. Upon selection of the refresh mode, the mux 43 selects the inputs from the refresh counter 45 on lines 53 and 55. Where before the x and y address information was selected from the graphics generator 1 and written into the image memory 13, now the x and y address information necessary to read the image memory 13 is sequentially selected from the UP counters of the refresh counter 45. These counters will be clocked via the clock signal on line 57, but with the counter producing the x addressing counting at a rate 512 times faster than that of the y counter. Thus upon selecting the refresh mode, the x and y axis address information is sequentially generated and coupled to the nine bit buses 9 and 11 via the mux 43. As mentioned these signals are also used to produce the horizontal and vertical sync signals on lines 15 and 17. It should be noted too that once the requisite graphics data has been written into the image memory 13, it is merely a matter of continuously reading the image memory 13 and refreshing the screen of the CRT 10 until the next graphics figure is to be displayed and at which time the mux 43 would again be switched to its calculation mode.

Figure 3C:
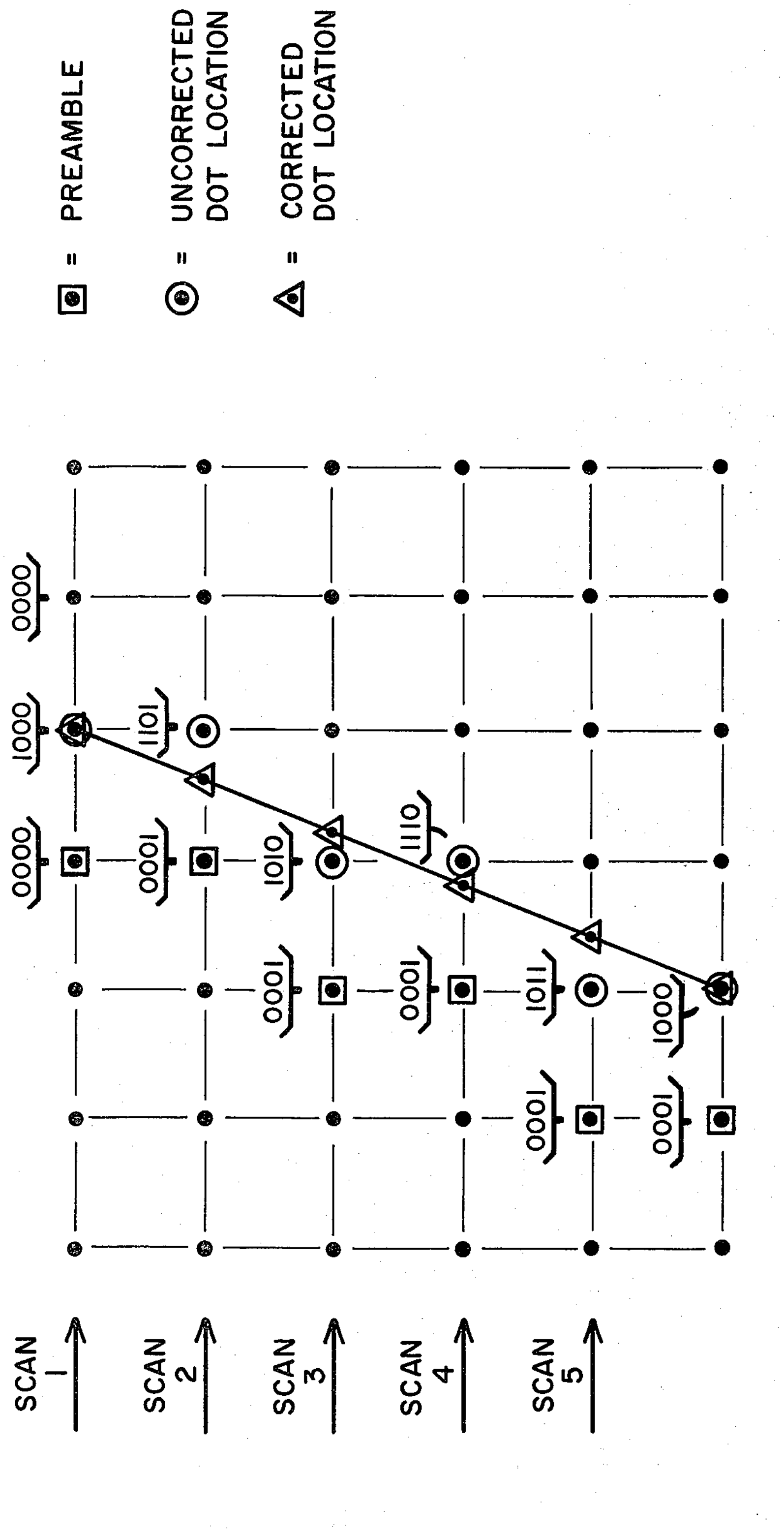
FIG. 3*c* shows an example for a vector and the various preamble and position correction codes associated with various pixels on the graphics figure.

Referring now to FIGS. 3*a*, 3*b* and 3*c* particular attention will now be directed to the peculiarities of the position correction code employed in the preferred embodiment and an example will be discussed to further clarify how the apparatus works in conjunction therewith. It should also be recalled that only those memory locations corresponding to the pixels of the calculated graphics figure contain unblanked position correction code information. It is to be noted though that, as hereinafter described, the memory locations immediately preceding each of these pixels also contains a preamble code that defines the direction of the positional correction for the succeeding pixel.

Referring now to FIG. 3*b*, the position correction code format for the preferred embodiment is shown relative to the various occurring functions for each bit position of the four bit code, as well as the various permutations that the position correction code may take for any given pixel. Specifically, each four bit code contains information relative to three functions. The first bit position defines whether or not the addressed pixel is to be displayed and causes the grid 37 to be unblanked. If an addressed pixel is to be displayed the first bit position will be a binary "1". If not, this bit position is a binary "0".

The next most significant bit position defines whether or not the correction relative the center reference point is to occur in the positive or negative direction. The present coding scheme, however, assumes that the positive direction is to the right or up and the negative direction is to the left or down. Thus, where a binary "0". is found in this bit position, it is assumed that the positional correction will be positive and where a binary "1" is found, the position correction will be negative.

The last two bit positions of each position correction code are relegated to defining the magnitude of the positional correction. In particular, the bit positions M1 and M2 define incremental deflections in eighths relative to each of the 0.020 square inch pixels. In particular, eight permutations are available for the three bit combinations of the sign and magnitude. It is to be noted that for the coding scheme in FIG. 3*b*, the possible positive corrections are $+\frac{1}{8}$, $+\frac{1}{4}$ and $+\frac{3}{8}$, whereas the negative corrections are $-\frac{1}{8}$, $-\frac{1}{4}$, $-\frac{3}{8}$ and $-\frac{1}{2}$. It is to be noted too, that while this coding scheme does not provide for a positive $\frac{1}{2}$ correction, the negative $\frac{1}{2}$ correction permits the graphics generator 1 to assign a positional correction to the next succeeding pixel from that pixel which one might otherwise expect the position correction to occur at so that the necessary correction can be accommodated. It should be apparent too that various coding schemes may be employed, containing more or less bits, as well as varying the assignments of the incremental deviations. The particular choice merely being a matter of design.

Recognizing that the position correction code format of FIG. 3*b* is decoded by the x-y decoder, driver 31, it should be noted that the present four bit code does not define whether the positional correction should occur relative to the x or y axis or some other axis. While an additional bit position could be added, so as to create a five bit position correction code, this would entail adding an additional plane to the image memory 13. Instead of adding this plane, the present apparatus has shifted the burden to the graphics generator 1. The graphics generator 1, thus when calculating the coordinates of each point on each graphics figure, also generates a peculiar preamble code that is stored in the image memory 13 at the remaining addresses.

Referring to FIG. 3*a*, the various possible preamble codes are shown. It is to be noted that the present apparatus positionally corrects the graphics pixels only for the x and y directions, but it is to be noted that it would be possible to correct for the xy direction or any other by providing additional circuitry and coding to accommodate these positional corrections. It is felt, however, that for most applications the present positional correction in x and y is sufficient.

Attention it first directed to the 0000 preamble code which corresponds to a "no correction" code. This code is stored at all the addresses in the image memory 13 where no correction is to occur. Consequently for any given graphics figure, the image memory 13 contains the 0000 code at all the addresses, except those addresses preceding the pixels to be corrected and those addresses of the actual pixels to be corrected. Thus, relative to the addresses preceding each graphics pixel, each of these addresses contains the x or y correction preamble code (i.e. 0001 or 0010). These preamble codes, upon refreshing, being detected by the x-y decoder, driver 31 and used to select between the x and y coil pairs of the x-y auxiliary yoke 41.

Referring now to FIG. 3*c*, an example is shown of a vector as it would be displayed on the CRT 10 of the present invention. Also shown are the various preamble codes, the positional correction codes and the corrected dot locations on the vector to which the electron beam would be redirected by the present apparatus.

Referring to the raster scan line 1, a plurality of the center reference points of a plurality of pixels are shown. Relative to the vector to be displayed, though, it is to be noted that at the image memory address corresponding to the pixel preceding the pixel to be displayed, the preamble code specifies no correction. Thus when the electron beam is directed to the coordinates of the next pixel and the 1000 position correction code is detected the grid 37 is unblanked and the electron beam causes the center of that pixel to be illuminated.

Upon scanning the raster scan line 2 and detecting the preamble code 0001, the apparatus next determines that a correction in x is to occur for the next pixel. Then upon addressing that pixel address of the image memory 13, the position correction code identifies that a $-\frac{3}{8}$ correction is to occur. The x-y decoder, driver circuitry 31 upon interpreting this code, then causes the electron beam to be deflected in a negative x direction, $\frac{3}{8}$'s of the pixel, so that the pixel is illuminated at the next point of the vector. Similarly, for each of the succeeding raster scan lines, the x-y decoder, driver circuitry 31 decodes the preamble code and position correction codes and ensures that the electron beam is directed to those positions within each pixel more closely correlating to the true points on the graphic figure. Thus in the case of FIGS. 2*a* and 2*b*, instead of an ellipse appearing as in FIG. 2*a*, it appears as in FIG. 2*b*.

Figure 4:
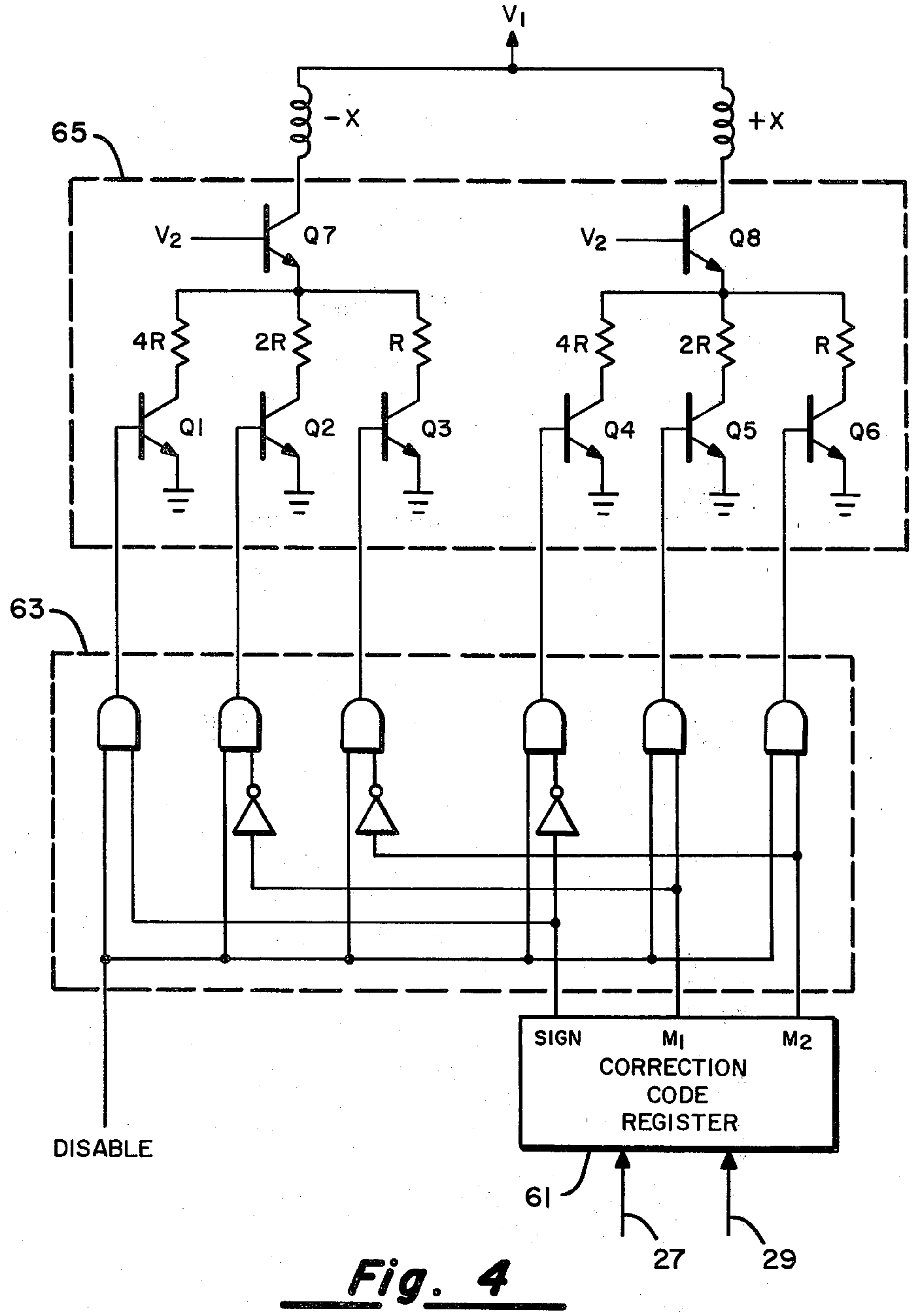
FIG. 4 is a schematic diagram of the x decoder, driver deflection circuitry used to drive the x deflection coils of the x-y auxiliary yoke.

Referring now to FIG. 4, the x deflection circuitry of the x-y decoder, driver circuitry 31 is shown in greater detail. While only the x deflection circuitry is shown, it is to be recognized that the y deflection circuitry is identical in detail and operates essentially the same, but merely drives the auxiliary y coil pair of the x-y auxiliary yoke 41. In particular, the x deflection circuitry is comprised of a correction code register 61, a logic decoder 63 and an analog driver section 65. It is to be recognized though that the minus and plus x coils, even though shown, are included in the x-y auxiliary yoke 41.

The general operation of the x deflection circuitry is to receive and latch each four bit code contained in each address of the image memory 13, as it is read. It is to be noted, however, that while the x-y decoder, driver circuitry 31 receives a code for each and every address, the CRT 10 only displays those addresses containing the position correction code, since the first bit position is a binary "0" in all other cases and which value does not enable the digital to analog convertor 33 nor unblank the grid 37. Further, any first bit binary "0" disables the x-y decoder, driver circuitry 31 via the disable line. It is to be recognized too, that while not shown, the x-y decoder, driver circuitry 31 also contains apparatus (i.e. a two bit flip-flop) responsive to the x and y correction preamble codes and which apparatus selects only one or the other of the x or y deflection halves prior to receipt of the next code. It is to be further recognized that if the outline of the graphics figure includes points in successive pixels on one raster scan line, such as at the top or bottom of an ellipse, then the preamble code will remain constant for each of the next successive graphic's pixels.

Upon receipt of the code contained in each address of the image memory 13, the correction code register 41 outputs the peculiar binary code to the appropriate AND gates of the logic decoder 63 so that the appropriate push-pull effect can occur (i.e. relative to the current differential between the plus and minus x or plus and minus y coils). This push-pull effect occurring because the outputs of the AND gates of the logic decoder 63 drive the bases of the respective parallel transistor combinations Q1, Q2, and Q3; Q4, Q5 and Q6, and consequently control the current flowing in the coil pairs of the x-y auxiliary yoke 41, depending on the code and which transistors conduct.

It is to be noted, too, that the values of the resistors in the analog driver section 65 are shown in multiples of a given resistance value R (i.e. R, 2R, or 4R). It is to be recognized though that the particular resistance value of R as well as the various multiples are merely selected depending upon the amount of current that is desired to flow through the coil pairs of the x-y auxiliary yoke 41. Therefore these values and the multiples thereof would merely be matters of choice, dependent only upon the design and the application peculiarities. It is also to be recalled that the actual sizing will depend upon the size wire and number of turns etc. employed in the coil pairs of the x-y auxiliary yoke 41. Thus depending upon the specific position correction code that is received by the x-y decoder, driver circuitry 31, the current differential flowing between the various coil pairs will change depending upon the amount of flux necessary to correctively deflect the electron beam within the desired pixel.

While the preferred embodiment has been described with respect to pixels having their reference points at the centers thereof, it is to be recognized that other reference systems are also possible. In particular, it may be desirous to locate the reference point at one corner of a pixel, say the lower left hand corner. Thus, all corrections in x or y would both be positive. This coding scheme would also provide simpler to implement in hardware than that previously mentioned, but it would require an x-y auxiliary yoke 41 having a greater deflection capability as well as an additional bit of binary information and consequently an additional plane of image memory 13.

Thus, while the present invention has been described with respect to a preferred embodiment thereof and with reference to possible changes thereto, other embodiments and additional changes may suggest themselves to those of skill in the art after reading the present specification. The following claims should therefore be interpreted within the spirit and scope of the foregoing description and should be interpreted to encompass substantial equivalents thereto.

What is claimed is:

1. A graphics display system, comprising:

a CRT having its screen segmented into a plurality of pixels;

graphics generator means for generating the x and y coordinates of a reference point within each of the plurality of pixels that comprise a graphics figure, and for generating a position correction code containing information in the axis, sign, and magnitude of positional correction for each of the generated graphics pixels;

first means for deflecting an electron beam of said CRT to the reference points of the graphics pixels; and second means respectively coupled to said position correction codes and said first means for incrementally deflecting said electron beam to a selected point relative to said reference point within each of the graphics pixels comprising:

memory means for storing in an equal first plurality of addressable locations, as are one-to-one respectively associated with said plurality of generated pixels that comprise a graphics figure, a first part of (said axis, said sign, and said magnitude information) of each said position correction code for each said generated graphics pixel, and for storing in an equal second plurality of addressable locations immediately addressably preceeding, and in one-to-one association with, said first plurality of addressable locations the remaining, second part of (said axis, said sign, and said magnitude information) of said position correction code for each generated graphics pixel;

logic means for successively addressing each said first plurality of addressable memory locations in order to obtain said first part information stored therein, and for addressing each associated one of said second plurality of addressable memory locations in order to obtain said second part information stored therein, and for reconstituting from both said first part information and said second part information each said position correction codes for each of said generated graphics pixels;

deflection means responsive to said reconstituted position correction codes for incrementally deflecting said electron beam to said selected point relative to said reference point within each of said generated graphics pixels;

thereby improving the resolution of the figures that are displayed on the screen of said CRT;

thereby storing said axis, said sign, and said magnitude information of each said position correction codes for each said generated graphics pixels in two, a first and a second, successive memory locations, whereby thusly each said first and said second memory locations need not contain so many bits as would be required if the entirety of (said axis, said sign, and said magnitude information) of each said position correction code were stored in one such, such first or such second, memory location.

2. A graphics display system as set forth in claim 1 wherein said deflection means within said second means further comprises:

means for converting each of said reconstituted position correction codes to an analog signal corresponding to an adjustment along the x or y axes within each of the graphics pixels; and auxiliary yoke means responsive to said analog signals for deflecting said electron beam within each pixel.

3. A graphics display system as set forth in claim 1 wherein said position correction code is defined with respect to a reference point at the center of each graphics pixel.

4. A graphics display system as set forth in claim 1 wherein said position correction code is defined with respect to a reference point at one corner of each graphics pixel.

5. A graphics display system as set forth in claim 1 wherein said deflection means within said second means further comprises:

push-pull means for converting said reconstituted position correction codes to analog signals; and auxiliary yoke means responsive to said analog signals for deflecting said electron beam within each graphics pixel.

6. A graphics display system, comprising:

a CRT having its screen seqmented into a multiplicity of graphics pixels;

a graphics generator for generating a plurality of coordinate codes each containing the x axis and y axis coordinates of a like plurality of reference points within a like plurality of graphics pixels which collectively constitute a graphics figure, and for generating an associated like plurality of position correction codes containing information on the coordinate axis, the direction, and the magnitude of positional correction relative to said reference point of each said plurality of graphics pixels;

an image memory with a like multiplicity of addressable locations in one-to-one correspondence with said multiplicity of graphics pixels;

control means which, during a calculation mode, are for writing said coordinate code for each said plurality of generated graphics pixels into a corresponding one of a like plurality of addressable locations within said image memory, and for writing a first part of said position correction code into said corresponding one of said like plurality of addressable locations within said image memory, and for writing a remaining, second, part of said position correction code into the immediately addressably adjacent one of said addressable locations to said corresponding one of said like plurality of addressable locations within said image memory, and which, during a refresh mode, are for reading the contents of each said multiplicity of addressable locations within said image memory, and for, responsively to said reading, reconstituting each said coordinate code plus, from said first part plus said second part, said associated position correction code for each said plurality of graphics pixels;

deflection means coupled to said image memory for, responsively to said coordinate code, deflecting an electron beam of said CRT to the reference point of each graphics pixel during said refresh mode; and position correction means synchronously coupled to said image memory and said deflection means for, responsively to said position correction code, incrementally deflecting said electron beam to a true position relative to said reference point within each of the graphics pixels during said refresh mode;

thereby improving the resolution of the graphics figures that are displayed by said system;

thereby storing each said position correction code, by first part and by second part, in two said addressable locations within said image memory, whereby each said addressable location does not require so many bits as would be required to store the entire said position correction code in one only such said addressable location.

7. The graphics display system according to claim 1 wherein said memory means for storing further comprise:

memory means for storing in a first plurality of addressable locations, as are one-to-one respectively associated with said plurality of generated pixels that comprise a graphics figure, a first part containing said sign and said magnitude information of each said position correction code for each said generated graphics pixel, and for storing in an equal second plurality of addressable locations immediately addressably preceeding, and in one-to-one association with, said first plurality of addressable locations the remaining, second, said axis information part of said position correction code for each said generated graphics pixel.

8. The graphics display system of claim 6 wherein said first part of said position correction code comprises said information on said direction and said magnitude of said positional correction, and wherein said second part of said position correction code comprises said information on said coordinate axis of said positional correction, relative to said reference point of each said plurality of graphics pixels.

* * * * *